US012665843B2

(12) United States Patent
Zhu et al.

(10) Patent No.: US 12,665,843 B2
(45) Date of Patent: Jun. 23, 2026

(54) DATA PROCESSING METHOD AND APPARATUS, FORWARDING CHIP, AND NETWORK DEVICE

(71) Applicant: New H3C Technologies Co., Ltd., Hangzhou (CN)

(72) Inventors: Shiyin Zhu, Beijing (CN); Guangliang Wen, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 56 days.

(21) Appl. No.: 18/715,011

(22) PCT Filed: Sep. 30, 2022

(86) PCT No.: PCT/CN2022/123398
§ 371 (c)(1),
(2) Date: May 30, 2024

(87) PCT Pub. No.: WO2024/065732
PCT Pub. Date: Apr. 4, 2024

(65) Prior Publication Data
US 2025/0030631 A1      Jan. 23, 2025

(51) Int. Cl.
*H04L 45/00* (2022.01)
*H04L 45/24* (2022.01)

(52) U.S. Cl.
CPC .............. *H04L 45/38* (2013.01); *H04L 45/24* (2013.01); *H04L 45/566* (2013.01)

(58) Field of Classification Search
CPC ........ H04L 45/38; H04L 45/24; H04L 45/566
See application file for complete search history.

(56) References Cited

U.S. PATENT DOCUMENTS 10,887,234 B1 * 1/2021 Singh ...................... H04L 45/14
2016/0226769 A1  8/2016 McCormick
(Continued)

FOREIGN PATENT DOCUMENTS

CN       102868683       1/2013
CN       113949667       1/2022
(Continued)

OTHER PUBLICATIONS

European Search Report issued in corresponding European Application No. 22960350.1, dated Dec. 12, 2024.
(Continued)

*Primary Examiner* — Esther B. Henderson
(74) *Attorney, Agent, or Firm* — NORTON ROSE FULBRIGHT US LLP

(57)      ABSTRACT
A data processing method, apparatus, forwarding chip and network device are disclosed. The method comprises: acquiring a first packet that needs to be forwarded through the multiple sending and selective receiving path; forwarding, if the network device is a source network device, the first packet to a next hop network device on the multiple sending and selective receiving path respectively through multiple paths comprised in the multiple sending and selective receiving path; forwarding, if the network device is an intermediate network device, the first packet to the next hop network device on the multiple sending and selective receiving path; extracting, if the network device is a destination network device, packet information from the first packet, storing extracted packet information if the extracted packet information is not stored in the network device, and forwarding the first packet to a destination terminal.

19 Claims, 7 Drawing Sheets

(56)     References Cited

U.S. PATENT DOCUMENTS

| 2019/0253341 | A1* | 8/2019 | Timmons ............. H04L 45/123 |
| 2021/0211937 | A1 | 7/2021 | Qu et al. |

FOREIGN PATENT DOCUMENTS

| CN | 114710810 | | 7/2022 |
| CN | 114793210 | | 7/2022 |
| JP | 2002359635 | B1 | 12/2002 |

OTHER PUBLICATIONS

International Search Report and Written Opinion issued in Corresponding PCT Application No. PCT/CN2022/123398, dated Jun. 2, 2023 (English Translation provided).

* cited by examiner

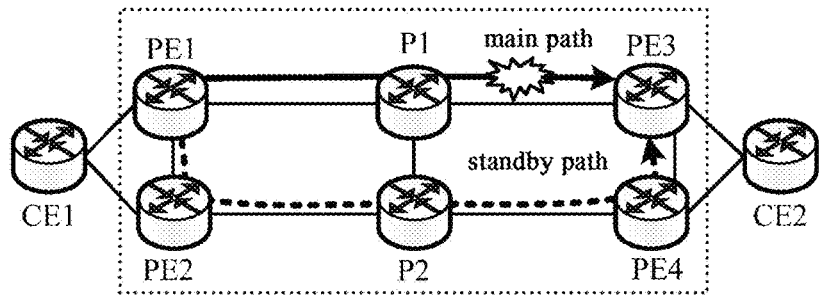

FIG. 1

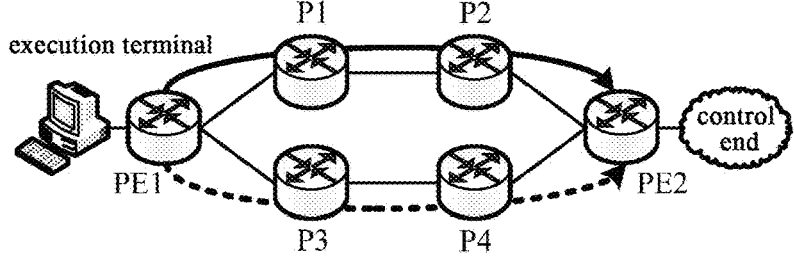

FIG. 2

| | |
|---|---|
| acquiring a first packet that needs to be forwarded through the multiple sending and selective receiving path | S31 |
| forwarding, if the network device is a source network device on the multiple sending and selective receiving path, the first packet to a next hop network device on the multiple sending and selective receiving path respectively through a plurality of paths comprised in the multiple sending and selective receiving path | S32 |
| forwarding, if the network device is an intermediate network device on the multiple sending and selective receiving path, the first packet to a next hop network device on the multiple sending and selective receiving path | S33 |
| extracting, if the network device is a destination network device on the multiple sending and selective receiving path, packet information from the first packet, storing extracted packet information if the extracted packet information is not stored in the network device, and forwarding the first packet to a destination terminal, wherein the packet information of the first packet is used to distinguish different packets of a same traffic flow and different packets of different traffic flows | S34 |

FIG. 3

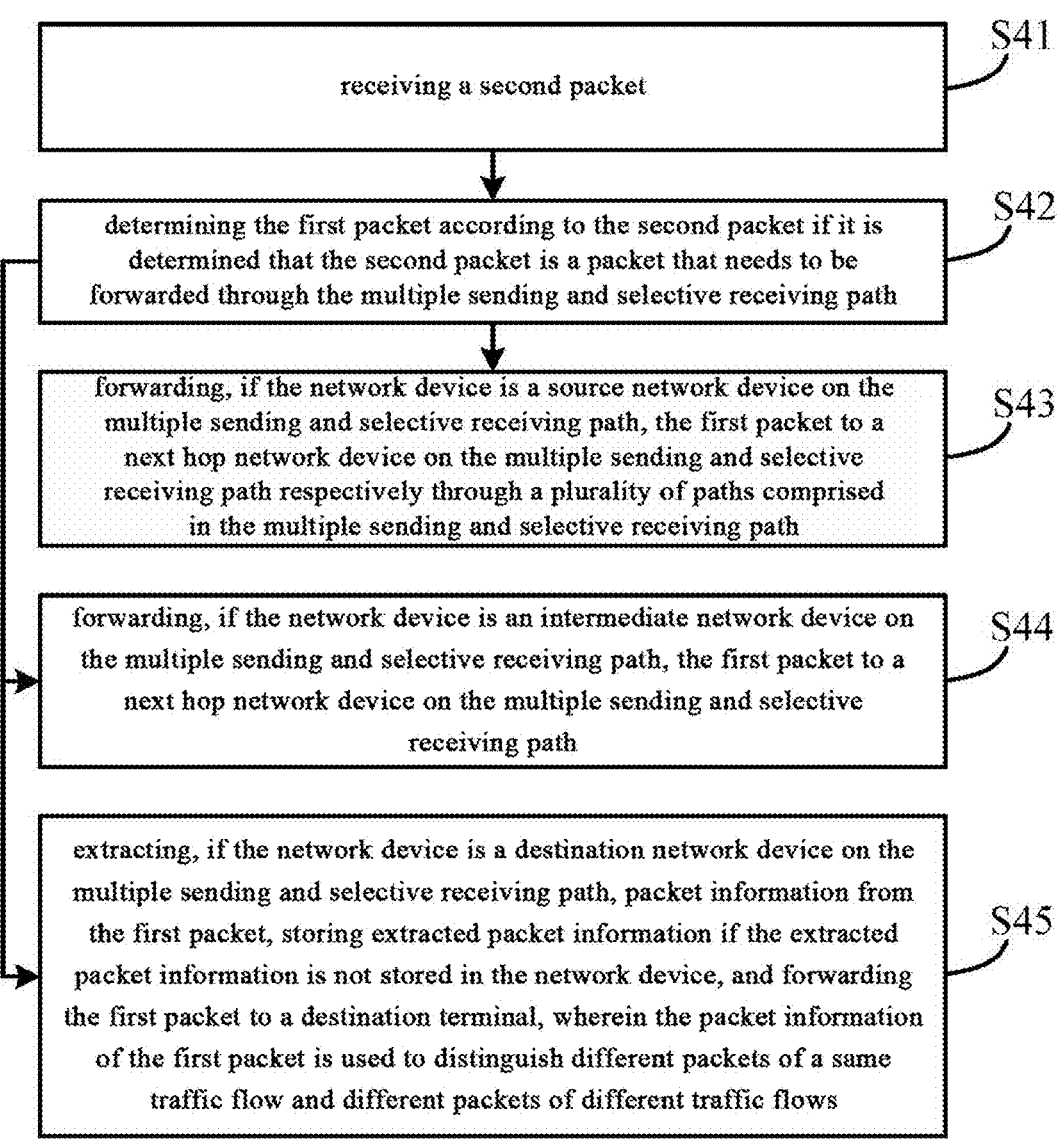

S41 receiving a second packet

S42 determining the first packet according to the second packet if it is determined that the second packet is a packet that needs to be forwarded through the multiple sending and selective receiving path

S43 forwarding, if the network device is a source network device on the multiple sending and selective receiving path, the first packet to a next hop network device on the multiple sending and selective receiving path respectively through a plurality of paths comprised in the multiple sending and selective receiving path

S44 forwarding, if the network device is an intermediate network device on the multiple sending and selective receiving path, the first packet to a next hop network device on the multiple sending and selective receiving path

S45 extracting, if the network device is a destination network device on the multiple sending and selective receiving path, packet information from the first packet, storing extracted packet information if the extracted packet information is not stored in the network device, and forwarding the first packet to a destination terminal, wherein the packet information of the first packet is used to distinguish different packets of a same traffic flow and different packets of different traffic flows

FIG. 4

| Version (4 bits) | HELEN (4 bits) | Service Type (8 bits) | Total Length (16 bits) | |
|---|---|---|---|---|
| Identification (16 bits) | | Flags (3 bits) | Fragmentation Offest (13 bits) | |
| Time to live (8 bits) | Protocol (8 bits) | Header Checksum (16 bits) | | |
| Source IP address (32 bits) | | | | |
| Destination IP address (32 bits) | | | | |
| Data | | | | |

FIG. 5

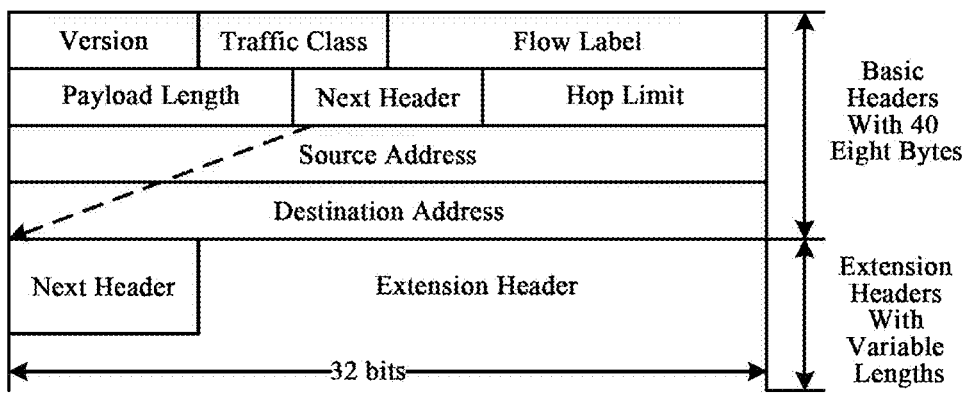
FIG. 6
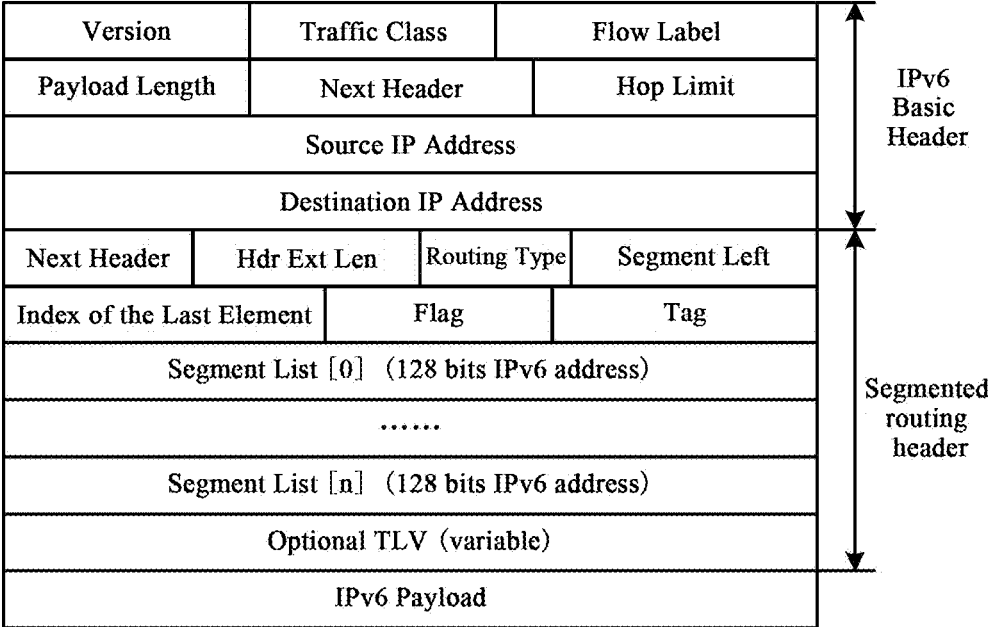
FIG. 7
| | flow label range |
|---|---|
| DIP1+SIP1 | 【1~M】 |
| DIP1+SIP2 | 【1~M】 |
| DIP2+SIP1 | 【1~M】 |
| DIP2+SIP2 | 【1~M】 |
FIG. 8

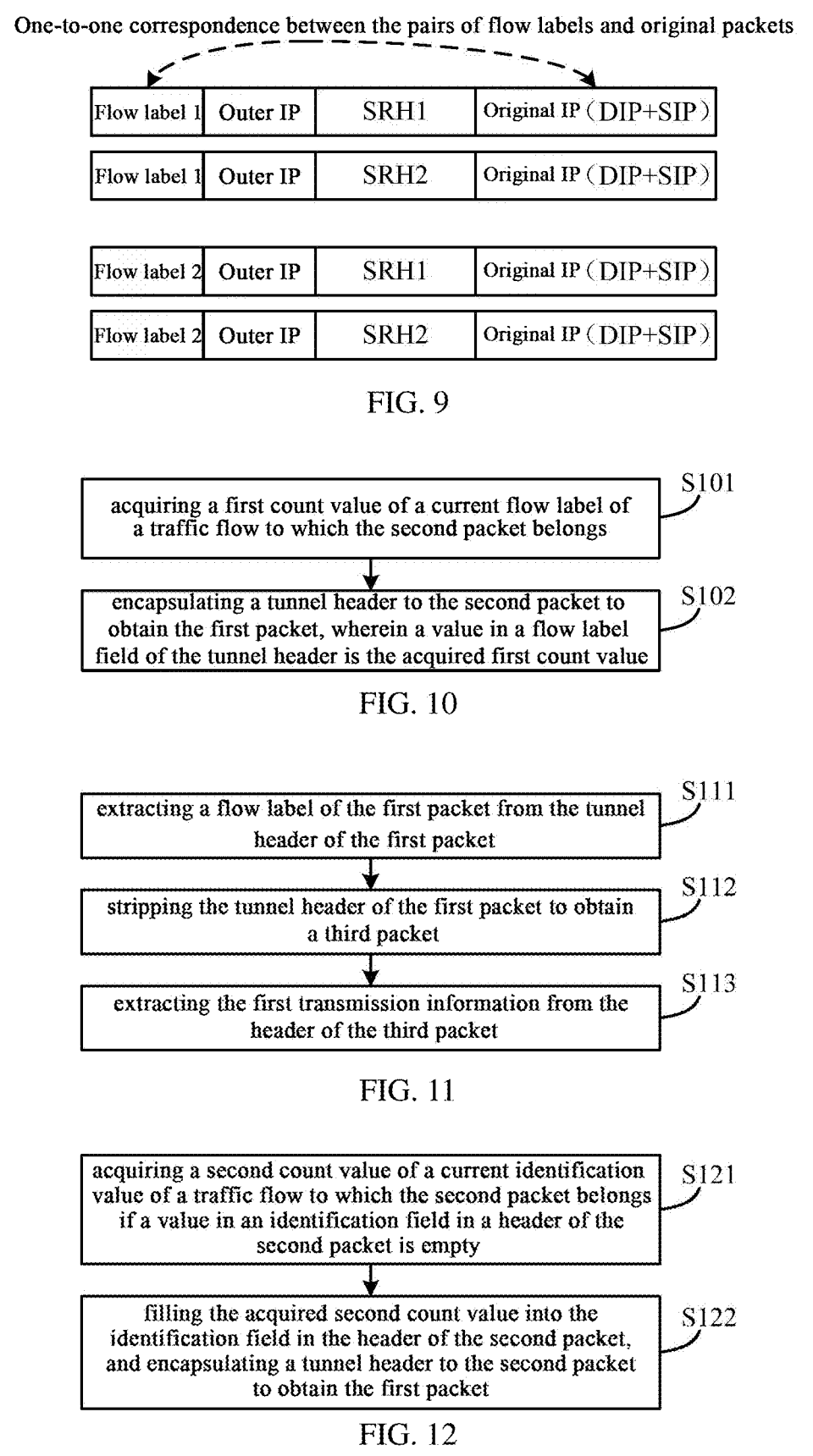

One-to-one correspondence between the pairs of flow labels and original packets

| Flow label 1 | Outer IP | SRH1 | Original IP (DIP+SIP) |

| Flow label 1 | Outer IP | SRH2 | Original IP (DIP+SIP) |

| Flow label 2 | Outer IP | SRH1 | Original IP (DIP+SIP) |

| Flow label 2 | Outer IP | SRH2 | Original IP (DIP+SIP) |

FIG. 9

S101
acquiring a first count value of a current flow label of a traffic flow to which the second packet belongs S102
encapsulating a tunnel header to the second packet to obtain the first packet, wherein a value in a flow label field of the tunnel header is the acquired first count value

FIG. 10

S111
extracting a flow label of the first packet from the tunnel header of the first packet S112
stripping the tunnel header of the first packet to obtain a third packet S113
extracting the first transmission information from the header of the third packet

FIG. 11

S121
acquiring a second count value of a current identification value of a traffic flow to which the second packet belongs if a value in an identification field in a header of the second packet is empty S122
filling the acquired second count value into the identification field in the header of the second packet, and encapsulating a tunnel header to the second packet to obtain the first packet

FIG. 12 storing the first packet in a scheduling queue corresponding to the traffic flow to which the first packet belongs  S161 sorting packets in the scheduling queue according to serial numbers of the packets  S162 forwarding the packet in the scheduling queue to the destination terminal when a scheduling period of the scheduling queue expires  S163

FIG. 16

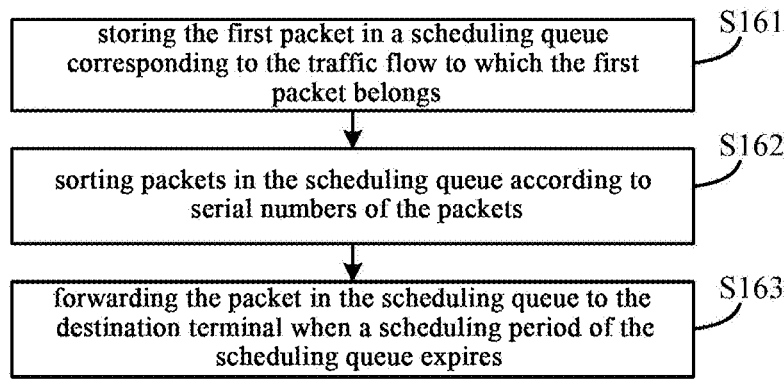

Start  S171 receiving a packet

S172 determining whether the packet is from the multiple sending and selective receiving path NO  S173 forwarding the packet normally

YES

S174 extracting a flow label in a tunnel header of the packet

S175 performing SR tunnel termination

S176 extracting SIP+DIP of the original packet

S177 performing a table lookup operation according to the extracted flow label, SIP and DIP S178 determining whether the extracted flow label, SIP and DIP exist in the table YES  S179 discarding the packet

NO

S1710 adding an entry including the extracted flow label, SIP and DIP in the table S1711 detecting whether the entry including the extracted flow label, SIP and DIP reaches the aging time YES  S1712 deleting the entry including the extracted flow label, SIP and DIP

NO

S1713 waiting for a next packet

FIG. 17

Start

S181 receiving a package

S182 determining whether the packet is from the multiple sending and selective receiving path

NO

S183 forwarding the packet normally

YES

S184 performing SR tunnel termination

S185 extracting an identification value, five-tuple information, MF and fragmentation offset of the original packet

S186 performing a table lookup operation according to the extracted identification value, five-tuple information, MF and fragmentation offset

S187 determining whether the extracted identification value, five-tuple information, MF and fragmentation offset exist in the table

YES

S188 discarding the packet

S1810 detecting whether the entry including the extracted identification value, five-tuple information, MF and fragmentation offset reaches the aging time

YES

S1811 deleting the entry including the extracted identification value, five-tuple information, MF and fragmentation offset

NO

S189 adding an entry including the extracted identification value, five-tuple information, MF and fragmentation offset in the table

NO

S1812 waiting for a next packet

FIG. 18

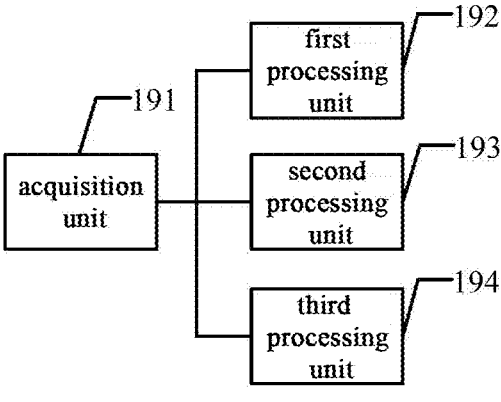

first processing unit — 192 acquisition unit — 191 second processing unit — 193 third processing unit — 194

DATA PROCESSING METHOD AND APPARATUS, FORWARDING CHIP, AND NETWORK DEVICE

CROSS REFERENCE TO RELATED APPLICATION

The present application is a national phase application under 35 U.S.C. § 371 of International Application No. PCT/CN2022/123398, filed Sep. 30, 2022, the entire contents of which are incorporated herein by reference in their entirety.

TECHNICAL FIELD

The disclosure relates to the technical field of communication, and in particular to a data processing method, apparatus, forwarding chip and network device.

BACKGROUND

In order to ensure the reliability of Internet services, multiple sending and selective receiving mechanism is often adopted to forward packets. At present, the multiple sending and selective receiving mechanism is implemented by software, with complex forwarding logic and low packet forwarding efficiency.

SUMMARY

The objects of examples of the disclosure are to provide a data processing method, apparatus, forwarding chip and network device for improving the packet forwarding efficiency. The specific technical solutions are as follows.

In a first aspect, an example of the disclosure provides a data processing method, which is applied to any forwarding chip in a network device, wherein the network device is a network device on a multiple sending and selective receiving path, comprising:

acquiring a first packet that needs to be forwarded through the multiple sending and selective receiving path;

forwarding, if the network device is a source network device on the multiple sending and selective receiving path, the first packet to a next hop network device on the multiple sending and selective receiving path respectively through multiple paths comprised in the multiple sending and selective receiving path;

forwarding, if the network device is an intermediate network device on the multiple sending and selective receiving path, the first packet to a next hop network device on the multiple sending and selective receiving path;

extracting, if the network device is a destination network device on the multiple sending and selective receiving path, packet information from the first packet, storing extracted packet information if the extracted packet information is not stored in the network device, and forwarding the first packet to a destination terminal, wherein the packet information of the first packet is used to distinguish different packets of a same traffic flow and different packets of different traffic flows.

In a second aspect, an example of disclosure also provides a data processing apparatus, which is applied to any forwarding chip in a network device, wherein the network device is a network device on a multiple sending and selective receiving path, comprising:

an acquisition unit, to acquire a first packet that needs to be forwarded through the multiple sending and selective receiving path;

a first processing unit, to forward, if the network device is a source network device on the multiple sending and selective receiving path, the first packet to a next hop network device on the multiple sending and selective receiving path respectively through multiple paths comprised in the multiple sending and selective receiving path;

a second processing unit, to forward, if the network device is an intermediate network device on the multiple sending and selective receiving path, the first packet to a next hop network device on the multiple sending and selective receiving path;

a third processing unit, to extract, if the network device is a destination network device on the multiple sending and selective receiving path, packet information from the first packet, store extracted packet information if the extracted packet information is not stored in the network device, and forward the first packet to a destination terminal, wherein the packet information of the first packet is to distinguish different packets of a same traffic flow and different packets of different traffic flows.

In a third aspect, an example of the disclosure provides a forwarding chip, which executes any block of the data processing method described above.

In a fourth aspect, an example of the disclosure provides a network device, which comprises at least one forwarding chip to execute any block of the data processing method described above.

In the technical solutions provided by the examples of the disclosure, the forwarding chip in the network device can process the first packet that needs to be forwarded through a multiple sending and selective receiving path immediately after the first packet is acquired, and forward the first packet to the destination terminal when the packet information of the first packet is not stored locally in the network device. In the case of the packet forwarding in multiple sending and selective receiving implemented by software, it is necessary to wait until all of the first packets forwarded through a multiple sending and selective receiving path have been received before processing the packets. However, in the technical solutions provided by the examples of the disclosure, the packet forwarding in multiple sending and selective receiving is implemented by the forwarding chip implemented by hardware, which ensures the reliability of packet transmission and improves the packet forwarding efficiency.

Of course, it is not necessary for any product or method of the disclosure to achieve all the advantages described above at the same time.

BRIEF DESCRIPTION OF THE DRAWINGS

In order to more clearly describe the technical solutions of the examples of the disclosure and the prior art, accompanying drawings that need to be used in the examples and the prior art will be briefly described below. Obviously, accompanying drawings described below are for only some of examples of the disclosure. Those skilled in the art may also obtain other accompanying drawings based on these accompanying drawings without any creative efforts.

FIG. 1 is a schematic diagram of a main-standby path mechanism;

FIG. 2 is a schematic diagram of a multiple sending and selective receiving mechanism;

FIG. 3 is a first schematic flow chart of a data processing method provided by an example of the disclosure;

FIG. 4 is a second schematic flow chart of a data processing method provided by an example of the disclosure;

FIG. 5 is a schematic diagram of an IPV4 header format provided by an example of the disclosure;

FIG. 6 is a schematic diagram of an IPV6 header format provided by an example of the disclosure;

FIG. 7 is a schematic diagram of a SRv6 header format provided by an example of the disclosure;

FIG. 8 is a schematic diagram of a correspondence between traffic flows and flow label ranges provided by an example of the disclosure;

FIG. 9 is a schematic diagram of a correspondence between original packets and flow labels provided by an example of the disclosure;

FIG. 10 is a first schematic diagram of updating packet information of a second packet to obtain a first packet provided by an example of the disclosure;

FIG. 11 is a first schematic diagram of extracting packet information from the first packet provided by an example of the disclosure;

FIG. 12 is a second schematic diagram of updating packet information of the second packet to obtain the first packet provided by an example of the disclosure;

FIG. 16 is a second schematic diagram of forwarding the first packet provided by an example of the disclosure;

FIG. 17 is a third schematic flow chart of a data processing method provided by an example of the disclosure;

FIG. 18 is a fourth schematic flow chart of a data processing method provided by an example of the disclosure;

FIG. 19 is a schematic structure diagram of a data processing apparatus provided by an example of the disclosure.

DETAILED DESCRIPTION

Figure 13:
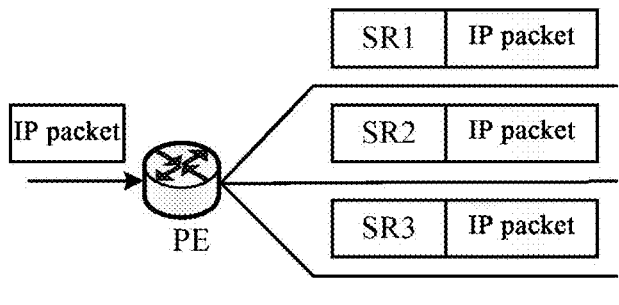
FIG. 13 is a schematic diagram of packet forwarding logic provided by an example of the disclosure.

In order to make the objective, technical solutions and advantages of the disclosure clearer and more understandable, the disclosure will be described in more detail below with reference to the accompanying drawings and examples. Obviously, the described examples are only some, and not all, of the examples of the disclosure. All other examples obtained based on the examples of the disclosure by those skilled in the art without any creative efforts fall into the scope of protection of the disclosure.

Deterministic network is one of research hotspots in the technical field of communication. IETF (The Internet Engineering Task Force) has set up a special working group to focus on the research of related technique such as reliability, delay and jitter of a network. In industrial scenarios, the deterministic network needs to provide 99.9999% reliability assurance, and still provide service reliability in the event of link and node failures.

In traditional IP (Internet Protocol) forwarding, MPLS (Multi-Protocol Label Switching) or SR (Segment Routing) forwarding, the reliability assurance is carried out through a main-standby path. However, there is a significant problem with the above main-standby path. That is, when a path or node fails, it takes time to recover, and the convergence time is generally 50 ms (millisecond).

In a main-standby path mechanism as shown in FIG. 1, a main path and a standby path are deployed between CE (Customer Edge) 1 and CE2, where devices on the main path include nodes such as PE (Provider Edge) 1, P (Provider) 1 and PE3, and devices on the standby path include nodes such as PE1, PE2, P2, PE4 and PE3. When the main path fails, it is needed to switch to the standby path and forward a packet by the standby path. However, in order to switch from the main path to the standby path, path detection and switching is required. Both path detection and switching take time, and the shortest convergence time of this process is about 50 ms. During this time, a packet will still be forwarded along the main path, resulting in packet loss.

The convergence time of 50 ms is not a problem in consumer disclosures, but there are big problems in industrial Internet such as automatic driving or on-site production, the convergence time of 50 ms is sufficient to cause major accidents. Therefore, a multiple sending and selective receiving mechanism is defined to ensure the reliability of services and achieve no impact on forwarding services when any link or node fails. Multiple sending and selective receiving mechanism means that the same traffic flow is transmitted to multiple paths at the same time, and the traffic flow is de-duplicated and sorted at a receiving end and then is forwarded to a destination.

In a multiple sending and selective receiving mechanism as shown in FIG. 2, a sending end PE1 connected with an execution terminal copies a packet, and forwards the packet through a path 1 indicated by a thick solid line and a path 2 indicated by a thick dotted line. The devices on the path 1 include PE1, P1, P2 and PE2, and the devices on the path 2 include PE1, P3, P4 and PE2. The receiving end PE2 connected with a control end receives the packet, de-duplicates and sorts the packet, and then forwards the packet. Failure of any path has no influence on packet forwarding, thus realizing high reliability of packet forwarding. The execution terminal can be a host or a camera and the like.

Although the multiple sending and selective receiving mechanism ensures high reliability, it also costly to perform multiple sending and selective receiving. The same packet needs to be copied and forwarded at the sending end, and to be selectively received, de-duplicated and sorted at the receiving end, which increases the complexity of a forwarding logic of the device and consumes bandwidth. In addition, the multiple sending and selective receiving mechanism in the prior art is implemented by software, it is necessary to wait until all the same packet forwarded by the multiple sending and selective receiving path have been received before processing the packets, so the packet forwarding efficiency is low.

To improve the packet forwarding efficiency, an example of the disclosure provides a data processing method, in which the forwarding chip in the network device can process the first packet that needs to be forwarded through the multiple sending and selective receiving path immediately after the first packet is acquired, and the first packet is forwarded to a destination terminal when the packet information of the first packet is not stored locally in the network device. In case of the packet forwarding in multiple sending and selective receiving implemented by software, it is necessary to wait until all the first packets forwarded by the multiple sending and selective receiving path have been received before processing the packets. However, in the technical solution provided by the example of the disclosure, the packet forwarding in multiple sending and selective receiving is implemented by the forwarding chip using hardware, which ensures the reliability of packet transmission and improves the packet forwarding efficiency.

The data processing method provided by the example of the disclosure will be described in detail through the following specific examples.

As shown in FIG. 3, the example of the disclosure provides a data processing method, which is applied to any forwarding chip in a network device. The network device is a network device on a multiple sending and selective receiving path, such as a source network device, such as PE1 as shown in FIG. 2; an intermediate network device, such as P1-P4 as shown in FIG. 2; a destination network device, such as PE2 as shown in FIG. 2.

In the example of the disclosure, the network device may be a device with a communication function such as a router, switch and the like. The network device may include one or more forwarding chips, which may be NP (Network Processor), Disclosure Specific Integrated Circuit (ASIC), Field-Programmable Gate Array (FPGA) or other hardware processing chips such as programmable logic devices, Digital Signal Processor (DSP), discrete gate or transistor logic devices, discrete hardware components and the like, or a combination of a plurality of chips, which is not limited.

Referring to FIG. 3, the above data processing method includes the following blocks:

Block S31: acquiring a first packet that needs to be forwarded through the multiple sending and selective receiving path;

Block S32: forwarding, if the network device is a source network device on the multiple sending and selective receiving path, the first packet to a next hop network device on the multiple sending and selective receiving path respectively through multiple paths included in the multiple sending and selective receiving path;

Block S33: forwarding, if the network device is an intermediate network device on the multiple sending and selective receiving path, the first packet to a next hop network device on the multiple sending and selective receiving path;

Block S34: extracting, if the network device is a destination network device on the multiple sending and selective receiving path, packet information from the first packet, storing extracted packet information if the extracted packet information is not stored in the network device, and forwarding the first packet to a destination terminal, wherein the packet information of the first packet is used to distinguish different packets of a same traffic flow and different packets of different traffic flows.

In the data processing method provided by the example of the disclosure, the forwarding chip in the network device can process the first packet that needs to be forwarded through the multiple sending and selective receiving path immediately after the first packet is acquired, and the first packet is forwarded to the destination terminal when the packet information of the first packet is not stored locally in the network device. In case of the packet forwarding in multiple sending and selective receiving implemented by software, it is necessary to wait until all the first packets forwarded by the multiple sending and selective receiving path have been received before processing the packets. However, in the technical solution provided by the example of the disclosure, the packet forwarding in multiple sending and selective receiving is implemented by the forwarding chip using hardware, which ensures the reliability of packet transmission and improves the packet forwarding efficiency.

In the above block S31, the first packet may be an IPV4 packet, an IPV6 packet or a SRv6 (Segment Routing IPv6) packet. The multiple sending and selective receiving path includes at least two paths. The multiple sending and selective receiving path can be implemented by SR tunnel, MPLS SR tunnel or IPv6 SR tunnel, which is not limited.

In the example of the disclosure, the network device may pre-store path information corresponding to the traffic flow forwarded through the multiple sending and selective receiving path. The path information may include at least one set of the following information: a logical port for forwarding a traffic flow; a source address and a destination address corresponding to the traffic flow; five-tuple information corresponding to the traffic flow. Five-tuple information can include a source IP address, destination IP address, source port, destination port and transmission protocol and the like.

According to the pre-stored path information, the network can identify a packet that needs to be forwarded through the multiple sending and selective receiving, that is, the first packet.

For example, the network device detects whether path information corresponding to a traffic flow to which the first packet belongs matches the pre-stored path information. It is determined that the first packet is a packet that needs to be forwarded through the multiple sending and selective receiving path if path information corresponding to a traffic flow to which the first packet belongs matches with the pre-stored path information. It is determined that the first packet is a packet that does not need to be forwarded through the multiple sending and selective receiving path if path information corresponding to a traffic flow to which the first packet belongs does not match with the pre-stored path information.

After the first packet that needs to be forwarded through the multiple sending and selective receiving path is acquired, the network device determines its own role on the multiple sending and selective receiving path, which is the source network device, the intermediate network device or the destination network device. When it is determined that the network device is the source network device on the multiple sending and selective receiving path, the above block S32 is executed. When it is determined that the network device is the intermediate network device on the multiple sending and selective receiving path, the above block S33 is executed. When it is determined that the network device is the destination network device on the multiple sending and selective receiving path, the above block S34 is executed.

In the above block S32, the source network device copies a first packet on each path included in the multiple sending and selective receiving path, and then forwards the first packet to the next hop network device on the multiple sending and selective receiving path through multiple paths included in the multiple sending and selective receiving path. As shown in the above FIG. 2, PE1 is the source network device. PE1 copies a first packet respectively, and forwards the packet to the next hop network devices P1 and P3 on a path indicated by the thick solid line and a path indicated by the thick dotted line, so as to forward the same first packet through two paths.

In the above block S33, after the first packet that needs to be forwarded through the multiple sending and selective receiving path is acquired, the intermediate network device directly forwards the first packet to the next hop network device on the multiple sending and selective receiving path, and refuses to perform other processing on the first packet. As shown in the above FIG. 2, P1 is an intermediate network device. After the first packet that needs to be forwarded through the multiple sending and selective receiving path is acquired, P1 forwards the packet to the next hop network device P2.

In the above block S34, the destination network device extracts packet information from the first packet, and determines whether the extracted packet information is stored in the destination network device. If the extracted packet information is not stored in the destination network device, it is indicated that the currently received first packet is a first packet of a corresponding traffic flow received through the multiple sending and selective receiving path. Then the destination network device stores the extracted packet information, determines a destination terminal of the first packet, and forwards the first packet to the destination terminal.

In the example of the disclosure, the network device can store the packet information in the form of a table, a distributed database or other ways, which is not limited.

In some examples, a data processing method is also provided based on the example shown in FIG. 3. As shown in FIG. 4, the method may include the following blocks:

Block S41: receiving a second packet;

Block S42: determining the first packet according to the second packet, if it is determined that the second packet is a packet that needs to be forwarded through the multiple sending and selective receiving path;

Block S43: forwarding, if the network device is a source network device on the multiple sending and selective receiving path, the first packet to a next hop network device on the multiple sending and selective receiving path respectively through multiple paths included in the multiple sending and selective receiving path;

Block S44: forwarding, if the network device is an intermediate network device on the multiple sending and selective receiving path, the first packet to the next hop network device on the multiple sending and selective receiving path;

Block S45: extracting, if the network device is a destination network device on the multiple sending and selective receiving path, packet information from the first packet, storing extracted packet information if the extracted packet information is not stored in the network device, and forwarding the first packet to a destination terminal, wherein the packet information of the first packet is used to distinguish different packets of a same traffic flow and different packets of different traffic flows.

For blocks S43-S45, reference can be made to the related description of blocks S32-S34 above.

In the technical solution provided by the example of the disclosure, for the second packet that needs to be forwarded through the multiple sending and selective receiving path, the network device determines the first packet according to the second packet, such that the packet information of the determined first packet can distinguish different packets of the same traffic flow and different packets of different traffic flows. That is, different packets that need to be forwarded through the multiple sending and selective receiving path have different packet information. This provides a basis for a fast and accurate deduplication processing of the destination network device on the multiple sending and selective receiving path in a forwarding chip layer.

In block S41, the second packet can be an IPV4 packet or an IPV6 packet, which is the original IP packet sent by the host.

In the example of the disclosure, the network device can pre-store the path information corresponding to the traffic flow forwarded through the multiple sending and selective receiving path. According to the pre-stored path information, the network can identify whether the second packet is a packet that needs to be forwarded through the multiple sending and selective receiving path.

For example, the network device detects whether the path information corresponding to the traffic flow to which the second packet belongs matches the pre-stored path information. It is determined that the second packet is a packet that needs to be forwarded through the multiple sending and selective receiving path if path information corresponding to a traffic flow to which the second packet belongs matches with the pre-stored path information. It is determined that the second packet is a packet that does not need to be forwarded through the multiple sending and selective receiving path if path information corresponding to a traffic flow to which the second packet belongs does not match with the pre-stored path information.

When it is determined that the second packet is a packet that needs to be forwarded through the multiple sending and selective receiving path, for the source network device, the above block S42 can be that the source network device updates the packet information of the second packet to obtain the first packet. Since the second packet is a packet that needs to be forwarded through the multiple sending and selective receiving path, the first packet obtained based on the second packet is also a packet that needs to be forwarded through the multiple sending and selective receiving path.

In addition, the updated packet information of the second packet, that is, the packet information of the first packet, can be used to distinguish different packets of the same traffic flow and different packets of different traffic flows. This facilitates the destination network device on the multiple sending and selective receiving path to accurately distinguish the same packet and different packets, so as to quickly and accurately implement the deduplication processing.

When it is determined that the second packet is a packet to be forwarded through the multiple sending and selective receiving path, for the intermediate network device or the destination network device, taking the intermediate network device as an example, the intermediate network device can consider the received second packet as the packet of which the packet information has been updated by the source network device. That is, the packet information of the second packet can be used to distinguish different packets of the same traffic flow and different packets of different traffic flows, and the second packet is directly determined as the first packet.

In some examples, if the second packet is a packet that does not need to be forwarded through the multiple sending and selective receiving path, the network device can directly forward the second packet. For example, the next hop network device is determined by querying a routing table, and then the second packet is forwarded to the determined next hop network device.

In some examples, the packet information may include a flow label. The flow label is used to represent the traffic flow information. In order to improve the accuracy of distinguishing different packets, the packet information may also include first transmission information, which includes any set of following information: a source address and a destination address corresponding to a traffic flow; and five-tuple information corresponding to the traffic flow.

In the example of the disclosure, it can be determined whether the first transmission information is represented by the source address and destination address corresponding to the traffic flow or the quintuple information corresponding to the traffic flow according to the size of the traffic flow. For example, when the traffic of the traffic flow forwarded through the multiple sending and selective receiving path is greater than a preset traffic threshold, the first transmission information is represented by the five-tuple information corresponding to the traffic flow, which improves the accuracy of distinguishing different packets of the same traffic flow and different packets of different traffic flows, and improves the accuracy of packet deduplication processing by the destination network device. When the traffic of the traffic flow forwarded through the multiple sending and selective receiving path is less than or equal to the preset traffic threshold, the first transmission information is represented by the source address and destination address corresponding to the traffic flow, so as to reduce the efficiency of packet deduplication processing by the destination network device.

The source address and destination address or five-tuple information corresponding to the traffic flow is encapsulated in a header of an original packet.

Taking the original packet as IPv4 packet as an example. The format of an IPV4 header is shown in FIG. 5. The IPv4 header includes Version, header length (helen), Service Type, Total Length, Identification, Flags, Fragmentation offset, Time to live, Protocol, Header Checksum, Source IP address and Destination IP address and the like. The IPV4 packet is formed by the IPv4 header combined with data to be transmitted. It can be know from FIG. 5 that the source network device can extract the source address and destination address or five-tuple information from the IPv4 header.

Taking the original packet as IPv6 packet as an example. The format of an IPV6 header is shown in FIG. 6. The IPV6 header includes basic headers with 40 eight bytes and extension headers with variable lengths. The basic headers include Version, Traffic Class, Flow Label, Payload Length, Next Header, Hop Limit, Source IP Address and Destination IP Address. The IPv6 packet is formed by the IPV6 header combined with data to be transmitted. It can be know from FIG. 6 that the source network device can extract the source address and destination address from the IPv6 header.

In addition, the flow label is encapsulated in a tunnel header.

Taking a SRv6 packet as an example, the tunnel header is a SRv6 header. As shown in FIG. 7, the SRv6 header further includes a SRH (Segment Routing Header) in addition to the basic header in the IPV6 header. The SRH includes a Next Header, Extension Header Length (Hdr Ext Len), Routing Type, Segment Left, Last Entry, Flags, Tag, Segment List and Optional TLV (Type Length Value) and so on. The SRv6 packet is formed by combining the SRv6 header and the IPV6 payload. In the example of the disclosure, the IPV6 payload in the SRv6 packet is the second packet received by the source network device on the multiple sending and selective receiving path.

In the example of the disclosure, the network device may include a plurality of forwarding chips. When there is a plurality of forwarding chips included in the network device, flow label ranges assigned for all of the forwarding chips do not overlap. In addition, a flow label range corresponding to the network device may or may not overlap with flow label ranges corresponding to other network devices in a network to which said network device belongs.

For the network device including a plurality of forwarding chips, such as a frame device, different flow label ranges are assigned to each forwarding chip to ensure that the flow label ranges of different forwarding chips do not overlap. That is, each flow label is unique and does not overlap for one network device. This can avoid assigning the same flow label to different packets of the same traffic flow, which would cause packets that are not the same packet to be discarded by a destination network device, thus affecting the packet forwarding efficiency.

In addition, flow label ranges assigned for different network devices can overlap. That is, label ranges of different traffic flows corresponding to different network devices can overlap. Based on this, in addition to the flow label, the packet information can also include other information such as the above first transmission information and so on. By combining the flow label and the first transmission information, packets with the same flow label and belonging to different traffic flows can be accurately distinguished, such that packets that are not the same packet will not be discarded.

In the example of the disclosure, flow label ranges corresponding to different traffic flows may be the same or different. As shown in FIG. 8, flow label ranges 1~M corresponding to four traffic flows are the same. In FIG. 8, DIP (Destination IP) 1+SIP (Source IP) 1 represents one traffic flow, DIP1+SIP2 represents one traffic flow, DIP2+SIP1 represents one traffic flow, and DIP2+SIP2 represents one traffic flow.

In addition, in one traffic flow, flow labels corresponding to the same packet are the same, and flow labels corresponding to different packets are different. As shown in FIG. 9, four lines of packets include flow labels, external IP, SRH and original IP. That is, the four lines of packets correspond to original packets whose original IP is DIP+SIP, the flow label is a flow label in the IPv6 basic header, and the external IP is the source IP and destination IP in the IPV6 basic header. The first two lines correspond to the same original packet, and packets in the first two lines are forwarded through two multiple sending and selective receiving paths indicated by SRH1 and SRH2 respectively, in which the flow labels in the tunnel header are all flow label 1. The last two lines correspond to the same original packet, and packets of the last two lines are forwarded through two multiple sending and selective receiving paths indicated by SRH1 and SRH2 respectively, in which the flow labels in the tunnel header are all flow label 2. The first two lines of packets and the last two lines of packets belong to the same traffic flow, and the flow label 1 is different from the flow label 2. It can be seen that in one traffic flow, there is one-to-one correspondence between the flow label and the original packet.

With the above configuration, the destination network device on the multiple sending and selective receiving path can accurately realize deduplication.

In some examples, in case that the packet information includes a flow label, as shown in FIG. 10, the block of the source network device updating the packet information of the second packet to obtain the first packet may include:

Block S101: acquiring a first count value of a current flow label of a traffic flow to which the second packet belongs.

In the example of the disclosure, one counter is assigned for each traffic flow, and the value range of the counter is consistent with the flow label range corresponding to the traffic flow. A counting rule of the counter is that each time a packet is sent, the count value is increased by 1.

In practice, there are situations where some disclosures or operating systems do not support the flow label. In such situations, the flow label in the second packet may be assigned a value of 0, which leads to the fact that the flow label cannot uniquely represent one traffic flow, nor can it be used as a unique identification of one packet. To accurately distinguish different packets of the same traffic flow, the source network device assigns a value to the flow label of the original packet (i.e., the second packet). For example, the traffic flow to which the second packet belongs is determined based on the five-tuple information of the second packet, and then the count value, i.e., the first count value, of the current flow label of said traffic flow is acquired. The first count value is a current count value of a counter corresponding to the traffic flow to which the second packet belongs.

Block S102: encapsulating a tunnel header to the second packet to obtain the first packet, wherein a value in a flow label field of the tunnel header is the acquired first count value.

After the first count value is acquired, the source network device can update the value of the flow label field of the tunnel header to the first count value, and encapsulate the updated tunnel header to the second packet to obtain the first packet.

After the first count value is acquired, the source network device can also encapsulate the updated tunnel header to the second packet to obtain the first packet, and then update the value of the flow label field of the tunnel header in the first packet to the first count value.

In the technical solution provided by the example of the disclosure, different flow labels are assigned to different packets in one traffic flow through the count value of the flow label of each traffic flow, which facilitates the destination network device on the multiple sending and selective receiving path to distinguish different packets and the same packet, and then to accurately perform deduplication.

In some examples, the source network device increases the first count value of the current flow label by 1 after encapsulating the tunnel header to the second packet to obtain the first packet. That is, the source network device increases the current count value of a counter corresponding to the traffic flow to which the second packet belongs by 1. When subsequently receiving a packet of the traffic flow to which the second packet belongs, the first count value recorded by the source network device can be acquired directly to implement update of the packet information.

In some examples, when the network device is the destination network device on the multiple sending and selective receiving path, the packet information extracted by the destination network device may include the flow label and the first transmission information mentioned above.

In this case, as shown in FIG. 11, extracting packet information from the first packet in the above block S34 may include blocks S111-S113.

Block S111: extracting a flow label of the first packet from a tunnel header of the first packet.

In the example of the disclosure, the flow label is a value rewritten by the source network device, which is used to uniquely identify a packet. The destination network device parses the tunnel header of the first packet, so as to extract the flow label of the first packet from the tunnel header of the first packet.

Block S112: stripping the tunnel header of the first packet to obtain a third packet.

After obtaining the stream label of the first packet in the tunnel header, the destination network device performs tunnel termination, i.e., strips the tunnel header of the first packet to obtain the third packet. The third packet is the original packet.

Block S113: extracting the first transmission information from a header of the third packet.

Complete transmission information is stored in the header of the original packet. After obtaining the third packet, the network device parses the header of the third packet to obtain the transmission information carried by the header of the third packet.

Subsequently, if it is determined that the extracted packet information is not stored, the destination network device forwards the third packet to the destination terminal.

In the technical solution provided by the example of the disclosure, the network device accurately extracts the packet information. One packet can be uniquely determined based on the extracted packet information, thereby ensuring the accurate deduplication of the packet.

In some examples, the packet information may include an identification value, such as the Identification in FIG. 5. In order to increase the accuracy of distinguishing different packets, the packet information may also include second transmission information, which may include one or more of five-tuple information, More Fragment (such as Flags in FIG. 5) and Fragmentation Offset. The second transmission information is encapsulated in the header of the original packet.

The identification value is used to distinguish fragmentation information. When there are fragmentation packets, the identification values of respective fragmentation packets of one original packet are consistent. When there is no fragmentation packet, each original packet can be given one identification value according to five-tuple information. Therefore, to distinguish a packet of a certain traffic flow, Five-tuple+Identification+MF (More Fragment)+Fragmentation Offset (Frag Offset) can be used to uniquely represent a packet. MF is the flag bit of flags in IPv4 header. If there is fragmentation, the value of flags is 1, and if there is no fragmentation, the value of flags is 0.

With the above identification value and the second transmission information, different packets and the same packet can be accurately distinguished, and then deduplication can be performed accurately.

In the example of the disclosure, the network device may include a plurality of forwarding chips. When the network device includes a plurality of forwarding chips, identification value ranges assigned for all of the forwarding chips do not overlap. The identification value range corresponding to the network device may or may not overlap with identification value ranges corresponding to other network devices in a network to which said network device belongs.

For the network device including a plurality of forwarding chips, such as a frame device, different identification value ranges are assigned for each forwarding chip, so as to ensure that the identification value ranges of different forwarding chips do not overlap. That is, each identification value is unique and does not overlap for one network device. This can avoid assigning the same identification value to different packets of the same traffic flow, which would cause packets that are not the same packet to be discarded by the destination network device, thus affecting the packet forwarding efficiency.

In addition, the identification value ranges for different network devices can overlap. That is, the label ranges of different traffic flows corresponding to different network devices can overlap. In addition to the identification value, the packet information can include other information, such as the second transmission information mentioned above and so on. A packet with the same identification value and belonging to different traffic flows can be accurately distinguished by combining the identification value and the second transmission information, so that packets which are not the same packet will not be discarded.

In the example of the disclosure, the identification value ranges corresponding to different traffic flows may be the same or different. In addition, in a traffic flow, the identification values corresponding to the same packet are the same, and the identification values corresponding to different packets are different. With the above configuration, the destination network device on the multiple sending and selective receiving path can accurately perform deduplication.

In some examples, in case that the packet information includes the identification value, as shown in FIG. 12, the source network device updating the packet information of the second packet to obtain the first packet may include:

Block S121: acquiring a second count value of a current identification value of a traffic flow to which the second packet belongs if a value in an identification field in a header of the second packet is empty.

In the example of the disclosure, one counter is assigned for each traffic flow, and the value range of the counter is consistent with the identification value range corresponding to the traffic flow. The counting rule of the counter is that each time a packet is sent, the count value is increased by 1.

In practice, there are situation where some disclosures or operating systems do not assign a value to the identification value of the original packet. In order to accurately distinguish different packets of the same traffic flow, the source network device assigns a value to the identification value of the original packet (i.e., the second packet). For example, the traffic flow to which the second packet belongs is determined based on the five-tuple information of the second packet, and then the count value, i.e., the second count value, of the current identification value of said traffic flow is acquired. The second count value is the current count value of the counter corresponding to the traffic flow to which the second packet belongs.

Block S122: filling the second count value into the identification field in the header of the second packet, and encapsulating a tunnel header to the second packet to obtain the first packet.

After the second count value is acquired, the source network device can update the value of the identification field in the header of the second packet to the second count value, and encapsulate the tunnel header to the second packet to obtain the first packet. For the tunnel header here, reference can be made to the SRv6 header shown in FIG. 7 above.

In the technical solution provided by the example of the disclosure, different identification values are assigned for different packets in one traffic flow through the count value of the identification value of each traffic flow, which facilitates the destination network device on the multiple sending and selective receiving path to distinguish different packets and the same packet, so as to accurately perform deduplication.

In some examples, the source network device increases the second count value of the current identification value by 1 after encapsulating the tunnel header to the second packet and obtaining the first packet. That is, the source network device increases the current count value of the counter corresponding to the traffic flow to which the second packet belongs by 1. When subsequently receiving a packet of the traffic flow to which the second packet belongs, the second count value recorded by the source network device can be acquired directly to implement update of the packet information.

In some examples, if the identification field in the header of the second packet is filled with the identification value, the source network device does not update the packet information and directly encapsulates the tunnel header to the second packet to obtain the first packet.

Subsequently, the source network device can forward the first packet to the next hop network device on the multiple sending and selective receiving path through multiple paths included in the multiple sending and selective receiving path. As shown in FIG. 13, the source network device forwards the original IP packet through three paths indicated by SR1-SR3. In FIG. 13, SR represents that a middle tunnel bearer of the multiple sending and selective receiving path is Segment Routing.

In the example of the disclosure, the intermediate tunnel bearer can also be MPLS SR or IPv6 SR, which is not limited.

In some examples, when the network device is the destination network device on the multiple sending and selective receiving path, the packet information extracted by the destination network device may include the identification value and the second transmission information mentioned above.

Figure 14:
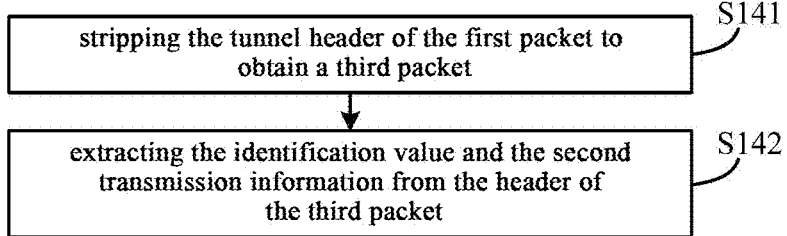
FIG. 14 is a second schematic diagram of extracting packet information from the first packet provided by an example of the disclosure.

In this case, as shown in FIG. 14, extracting packet information from the first packet in the above block S34 may include blocks S141-S142.

Block S141: stripping a tunnel header of the first packet to obtain a third packet.

After obtaining the first packet, the destination network device performs tunnel termination, that is, strips the tunnel header of the first packet to obtain the third packet. The third packet is the original packet.

Block S142: extracting the identification value and the second transmission information from a header of the third packet.

Complete transmission information is stored in the header of the original packet. After obtaining the third packet, the network device parses the header of the third packet to obtain the transmission information carried by the header of the third packet.

Subsequently, if it is determined that the extracted packet information is not stored, the destination network device forwards the third packet to the destination terminal.

In the technical solution provided by the example of the disclosure, the network device accurately extracts the packet information. One packet can be uniquely determined based on the extracted packet information, thereby ensuring the accurate deduplication of the packet.

In some examples, if the destination network device determines that the extracted packet information is stored in the destination network device, it is indicated that the currently received first packet is not a first packet of a corresponding traffic flow received through the multiple sending and selective receiving path. That is, the currently received first packet is a repeatedly received packet, and the destination network device can directly discard the first packet, so as to implement the deduplication.

In some examples, the destination network device configures an aging mechanism. The destination network device uses the configured aging mechanism to dynamically delete packet information to avoid the expansion of packet information, and also to avoid the problem of mistakenly discarding packets caused by the inversion of packet information.

In the example of the disclosure, the aging mechanism can be implemented by any one or more of following trigger modes:

Mode 1: matching trigger. Specifically, in this mode, after the packet information is extracted from the first packet, when the acquired packet information of the first packet matches the packet information stored in the network device, that is, the packet information extracted from the first packet is stored in the network device, the aging mechanism is trigged. That is, it is detected whether the extracted packet information stored in the network device reaches an aging time, then the extracted packet information stored in the network device is deleted if the extracted packet information reaches the aging time.

Mode 2: periodic trigger. Specifically, in this mode, it is periodically detected whether each piece of packet information stored in the network device reaches the aging time, then this piece of packet information reaching the aging time is deleted from packet information stored in the network device.

Mode 3: real-time trigger. Specifically, in this mode, each piece of packet information stored in the network device is monitored in real time. When it is monitored that any piece of packet information reaches the aging time, this piece of packet information is deleted.

In the example of the disclosure, the aging mechanism can also be implemented in other trigger modes, which is not limited.

Figure 15:
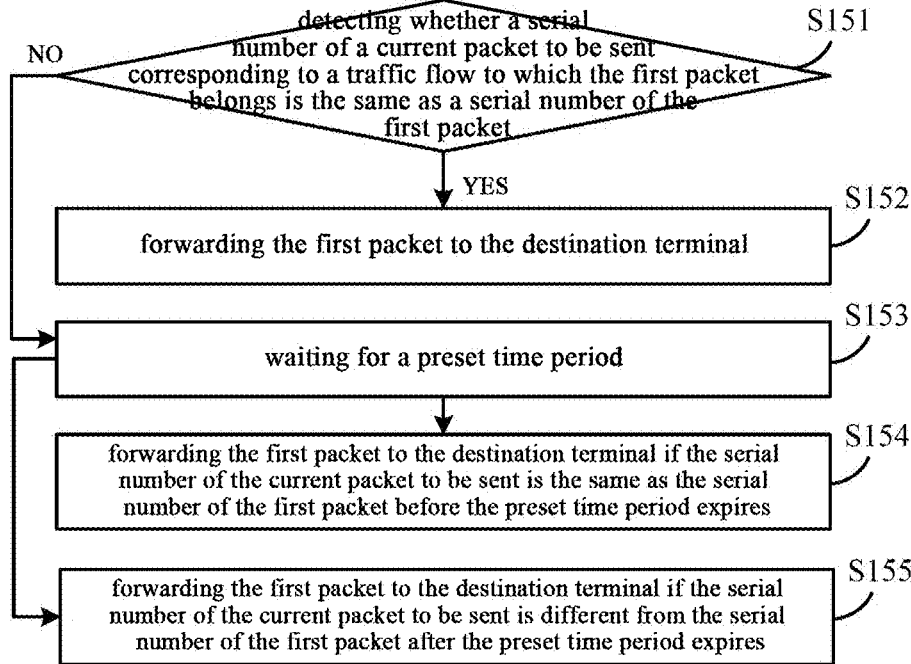
FIG. 15 is a first schematic diagram of forwarding the first packet provided by an example of the disclosure.

In some examples, as shown in FIG. 15, the intermediate network device and the destination network device forwarding the first packet to the destination terminal can be refined into the following blocks:

Block S151: detecting whether a serial number of a current packet to be sent corresponding to a traffic flow to which the first packet belongs is the same as a serial number of the first packet. If the two serial numbers are same, block S152 is executed. If the two serial numbers are different, block S153 is executed.

Block S152: forwarding the first packet to the destination terminal.

Block S153: waiting for a preset time period.

Block S154: forwarding the first packet to the destination terminal if the serial number of the current packet to be sent is the same as the serial number of the first packet before the preset time period expires.

Block S155: forwarding the first packet to the destination terminal if the serial number of the current packet to be sent is different from the serial number of the first packet after the preset time period expires.

In the example of the disclosure, for a network device which does not support forwarding with a specified period, before sending the first packet, the network device can write the first packet into the reordering buffer, and detect whether the serial number of the current packet to be sent corresponding to the traffic flow to which the first packet belongs is the same as the serial number of the first packet.

If the two serial numbers are same, it is indicated that it is just the turn to forward the first packet when packets are forwarded in sequence. Then the network device directly forwards the first packet to the destination terminal, and updates the serial number of the current packet to be sent corresponding to the traffic flow to which the first packet belongs to a serial number of a next packet of the first packet.

If the two serial numbers are different, it is indicated that it is not the turn to forward the first packet when packets are forwarded in sequence, and the last packet that needs to be forwarded has not been received. The network device temporarily refuses to forward the first packet and waits for the preset time period. After the preset time period expires, block S151 can be repeated to detect whether the serial number of the current packet to be sent corresponding to the traffic flow to which the first packet belongs is the same as the serial number of the first packet.

If it is detected that the serial number of the current packet to be sent corresponding to the traffic flow to which the first packet belongs is the same as the serial number of the first packet before the preset time period expires, the first packet is forwarded to the destination terminal, and the serial number of the current packet to be sent corresponding to the traffic flow to which the first packet belongs is updated to be a serial number of a next packet of the first packet.

If it is detected that the serial number of the current packet to be sent corresponding to the traffic flow to which the first packet belongs is still different from the serial number of the first packet after the preset time period expires, it is indicated that the last packet that needs to be forwarded is lost. The network device directly forwards the first packet to the destination terminal, and updates the serial number of the current packet to be sent corresponding to the traffic flow to which the first packet belongs to a serial number of a next packet of the first packet. The preset time period can be set according to actual needs.

If the network device detects that the serial number of the current packet to be sent corresponding to the traffic flow to which the first packet belongs is the same as the serial number of the first packet during the process of waiting for the preset time period, the first packet is forwarded to the destination terminal, and the serial number of the current packet to be sent corresponding to the traffic flow to which the first packet belongs is updated to be a serial number of a next packet of the first packet.

In the technical solution provided by the example of the disclosure, the network device realizes packet sequence preservation through the serial number of the packet, which ensures that the destination terminal performs correct traffic processing based on the packet.

In other examples, as shown in FIG. 16, the intermediate network device and the destination network device forwarding the first packet to the destination terminal can be refined into the following blocks:

Block S161: storing the first packet in a scheduling queue corresponding to a traffic flow to which the first packet belongs.

In the example of the disclosure, for a network device which supports forwarding with a specified period, the network device is configured with scheduling queues corresponding to different traffic flows. After acquiring the first packet, the network device determines a scheduling queue corresponding to the traffic flow to which the first packet belongs, and then stores the first packet in the determined scheduling queue.

Block S162: sorting packets in the scheduling queue according to serial numbers of the packets.

After the first packet has been stored in the determined scheduling queue, the network device sorts all packets in the scheduling queue.

Block S163: forwarding the packets in the scheduling queue to the destination terminal when a scheduling period of the scheduling queue expires.

The network device can monitor whether the scheduling period of the scheduling queue expires in real time. When it is monitored that the scheduling period of the scheduling queue expires, the network device can directly forward the sorted packets in the scheduling queue.

In the technical solution provided by the example of the disclosure, the network device realizes packet sequence preservation through the serial number of the packet, which ensures that the destination terminal performs correct traffic processing based on the packet. In addition, it can be ensured that a transmission delay and jitter are within a predetermined range by forwarding the packet according to a specified period, so as to realize deterministic transmission, such that the technical solution provided by the example of the disclosure is more suitable for the industrial Internet.

The data processing method provided by an example of the present disclosure will be descried below with reference to FIG. 17. In FIG. 17, the description is given in case that the destination network device is taken as an execution subject, the tunnel is SR tunnel, and transmission information includes a source IP (SIP) and a destination IP (DIP).

Block S171: the destination network device receives a packet. The packet can be obtained by performing SR tunnel encapsulation on an IPV4 packet or performing SR tunnel encapsulation on an IPV6 packet. The packet can also be an IPv4 packet or an IPV6 packet and so on.

Block S172: the destination network device determines whether the packet is from the multiple sending and selective receiving path. If the packet is from the multiple sending and selective receiving path, block S174 is executed. If the packet is not from the multiple sending and selective receiving path, block S173 is executed.

Block S173: the destination network device forwards the packet normally.

At this time, the received packet is an IPV4 packet or an IPV6 packet and so on.

Block S174: the destination network device extracts a flow label in a tunnel header of the packet.

Block S175: the destination network device performs SR tunnel termination, that is, strips the tunnel header of the packet to obtain the original packet.

Block S176: the destination network device extracts SIP+ DIP of the original packet.

Block S177: the destination network device performs a table lookup operation according to the extracted flow label, SIP and DIP.

The table stores packet information such as the flow label, SIP and DIP extracted from the received packet in the multiple sending and selective receiving path.

Block S178: the destination network device determines whether the extracted flow label, SIP and DIP exist in the table. If so, block S179 is executed. If not, block S1710 is executed.

Block S179: the destination network device discards the packet. Thereafter, block S1711 is executed.

Block S1710: the destination network device adds an entry including the extracted flow label, SIP and DIP in the table. Thereafter, block S1713 is executed.

Block S1711: the destination network device detects whether the entry including the extracted flow label, SIP and DIP reaches the aging time. If so, block S1712 is executed. If not, block S1713 is executed.

Block S1712, the destination network device deletes the entry including the extracted flow label, SIP and DIP.

The dynamic deletion of the entry is implemented by using the aging mechanism, so as to avoid expansion of the entry, and to also avoid the problem of mistakenly discarding packets caused by the inversion of flow labels.

Block S1713: the destination network device waits to receive a next packet.

The description of above blocks S171-S1713 is relatively simple, and reference can be made to the relevant description of FIGS. 4-11 above.

The data processing method provided by an example of the disclosure will be described below with reference to FIG. 18. In FIG. 18, the description is given in case that the destination network device is taken as an execution subject, the tunnel is SR tunnel, and the second transmission information includes five-tuple information, MF and Fragmentation Offset.

Block S181: the destination network device receives a packet. The packet can be obtained by performing SR tunnel encapsulation on an IPV4 packet. The packet can also be an IPV4 packet or an IPV6 packet and so on.

Block S182: the destination network device determines whether the packet is from the multiple sending and selective receiving path. If the packet is from the multiple sending and selective receiving path, block S184 is executed. If the packet is not from the multiple sending and selective receiving path, block S183 is executed.

Block S183: the destination network device forwards the packet normally.

At this time, the received packet is an IPV4 packet or an IPV6 packet and so on.

Block S184: the destination network device performs SR tunnel termination, that is, strips a tunnel header of the packet to obtain the original packet.

Block S185, the destination network device extracts an identification value, five-tuple information, MF and Fragmentation Offset of the original packet.

Block S186: the destination network device performs a table lookup operation according to the extracted identification value, five-tuple information, MF and Fragmentation Offset.

The table stores packet information such as the identification value, five-tuple information, MF and Fragmentation Offset extracted from the received packets in the multiple sending and selective receiving path.

Block S187: the destination network device determines whether the extracted identification value, five-tuple information, MF and Fragmentation Offset exist in the table. If so, block S188 is executed. If not, block S189 is executed Block S188: the destination network device discards the packet. Thereafter, block S1810 is executed.

Block S189: the destination network device adds an entry including the extracted identification value, five-tuple information, MF and Fragmentation Offset in the table. Thereafter, block S1812 is executed.

Block S1810: the destination network device detects whether the entry including the extracted identification value, five-tuple information, MF and Fragmentation Offset reaches the aging time. If so, block S1811 is executed. If not, block S1812 is executed.

Block S1811: the destination network device deletes the entry including the extracted identification value, five-tuple information, MF and Fragmentation Offset.

The dynamic deletion of the entry is implemented by using the aging mechanism, so as to avoid expansion of the entry, and to also avoid the problem of mistakenly discarding packets caused by the inversion of flow labels.

Block S1812, the destination network device waits to receive a next packet.

The description of above blocks S181-S1812 is relatively simple, and reference can be made to the relevant description of FIGS. 4-11 and FIGS. 12-16 above.

In the example of the disclosure, the network device may also separately set an aging task, which is used to delete entries that have reached the aging time but have not been actively deleted because they are not matched by subsequent packets, such as entries that have not been actively deleted because blocks S178-S1713 or blocks S187-S1812 above are not executed. The aging task can be implemented by hardware or software, or both, which is not limited.

Corresponding to the above data processing method, an example of the disclosure also provides a data processing apparatus, as shown in FIG. 19, which is applied to any forwarding chip in a network device, the network device is a network device on a multiple sending and selective receiving path, the apparatus including:

an acquisition unit 191, to acquire a first packet that needs to be forwarded through the multiple sending and selective receiving path;

a first processing unit 192, to forward, if the network device is a source network device on the multiple sending and selective receiving path, the first packet to a next hop network device on the multiple sending and selective receiving path respectively through multiple paths included in the multiple sending and selective receiving path;

a second processing unit 193, to forward, if the network device is an intermediate network device on the multiple sending and selective receiving path, the first packet to a next hop network device on the multiple sending and selective receiving path;

a third processing unit 194, to extract, if the network device is a destination network device on the multiple sending and selective receiving path, packet information from the first packet, store extracted packet information if the extracted packet information is not stored in the network device, and forward the first packet to a destination terminal, wherein the packet information of the first packet is used to distinguish different packets of a same traffic flow and different packets of different traffic flows.

In some examples, the acquisition unit 191 may be specifically to:

receive a second packet;

determine the first packet according to the second packet if it is determined that the second packet is a packet that needs to be forwarded through the multiple sending and selective receiving path.

In some examples, the acquisition unit 191 may be specifically to:

update packet information of the second packet to obtain the first packet if the network device is the source network device on the multiple sending and selective receiving path;

determine the second packet as the first packet if the network device is the intermediate network device or the destination network device on the multiple sending and selective receiving path.

In some examples, the obtaining unit 191 may also be to:

forward the second packet to a determined next hop network device if it is determined that the second packet is a packet which does not need to be forwarded through the multiple sending and selective receiving path.

In some examples, the above data processing apparatus may further include a determination unit, which is to determine whether the second packet is a packet that needs to be forwarded through the multiple sending and selective receiving path, and specifically is to:

determine whether path information corresponding to a traffic flow to which the second packet belongs matches with pre-stored path information, wherein the pre-stored path information is path information corresponding to a traffic flow forwarded through the multiple sending and selective receiving path;

determine that the second packet is a packet which needs to be forwarded through the multiple sending and selective receiving path if path information corresponding to a traffic flow to which the second packet belongs matches with the pre-stored path information;

determine the second packet is a packet which does not need to be forwarded through the multiple sending and selective receiving path if path information corresponding to a traffic flow to which the second packet belongs does not match with the pre-stored path information.

In some examples, the path information may include at least one set of the following information:

a logical port for forwarding a traffic flow;

a source address and a destination address corresponding to a traffic flow;

five-tuple information corresponding to a traffic flow.

In some examples, the packet information may include a flow label.

The acquisition unit is specifically to:

acquire a first count value of a current flow label of a traffic flow to which the second packet belongs;

encapsulate a tunnel header to the second packet to obtain the first packet, wherein a value in a flow label field of the tunnel header is the acquired first count value.

In some examples, the acquisition unit 191 may also be to:

increase the first count value of the current flow label by 1 after the tunnel header is encapsulated to the second packet to obtain the first packet.

In some examples, the packet information includes a flow label and first transmission information, and the first transmission information includes any set of following information: a source address and a destination address corresponding to a traffic flow; and five-tuple information corresponding to a traffic flow.

The third processing unit 194 can be specifically to:

extract a flow label of the first packet from a tunnel header of the first packet;

stripe the tunnel header of the first packet to obtain a third packet;

extract transmission information from a header of the third packet.

In some examples, when the network device include a plurality of forwarding chips, flow label ranges assigned for all of the forwarding chips do not overlap, and a flow label range corresponding to the network device overlaps or does not overlap with flow label ranges corresponding to other network devices in a network to which the network device belongs.

In some examples, flow label ranges corresponding to different traffic flows are the same or different. In one traffic flow, flow labels corresponding to the same packet are the same, and flow labels corresponding to different packets are different.

In some examples, the packet information may include an identification value.

The acquisition unit 191 is specifically to:

acquire a second count value of a current identification value of a traffic flow to which the second packet belongs if a value in an identification field in a header of the second packet is empty;

fill the acquired second count value into the identification field in the header of the second packet, and encapsulate a tunnel header to the second packet to obtain the first packet.

In some examples, the acquisition unit 191 may also be to:

increase the second count value of the current identification value by 1 after the tunnel header is encapsulated to the second packet to obtain the first packet.

In some examples, the acquisition unit 191 may also be to:

encapsulate the tunnel header to the second packet to obtain the first packet if the identification field in the header of the second packet is filled with an identification value.

In some examples, the packet information may include an identification value and second transmission information, and the second transmission information includes one or more of five-tuple information, More Fragment and Fragmentation Offset.

The third processing unit 194 can be specifically to:

stripe a tunnel header of the first packet to obtain a third packet;

extract the packet information from a header of the third packet.

In some examples, when the network device include a plurality of forwarding chips, identification value ranges assigned for all of the forwarding chips do not overlap; and an identification value range corresponding to the network device overlaps or does not overlap with identification value ranges corresponding to other network devices in a network to which the network device belongs.

In some examples, identification value ranges corresponding to different traffic flows are the same or different. In one traffic flow, identification values corresponding to the same packet are the same, and identification values corresponding to different packets are different.

In some examples, the above data processing apparatus may further include:

a discarding unit, to, after the packet information is extracted from the first packet, discard the first packet if the extracted packet information is stored in the network device.

In some examples, the above data processing apparatus may further include an aging unit to:

after the packet information is extracted from the first packet, detect, if the extracted packet information is stored in the network device, whether the extracted packet information stored in the network device reaches an aging time, delete the extracted packet information stored in the network device if the extracted packet information reaches the aging time; or periodically delete packet information reaching the aging time from the packet information stored in the network device; or monitor each piece of packet information stored in the network device in real time, when it is monitored that the any piece of packet information reaches the aging time, delete this piece of packet information.

In some examples, the third processing unit 194 may be specifically to:

forward the first packet to the destination terminal if a serial number of a current packet to be sent corresponding to a traffic flow to which the first packet belongs is the same as a serial number of the first packet;

wait for a preset time if the serial number of the current packet to be sent corresponding to the traffic flow to which the first packet belongs is the different as the serial number of the first packet;

forward the first packet to the destination terminal if the serial number of the current packet to be sent corresponding to the traffic flow to which the first packet belongs is the same as the serial number of the first packet before the preset time expires;

forward the first packet to the destination terminal if the serial number of the current packet to be sent corresponding to the traffic flow to which the first packet belongs is different from the serial number of the first packet after the preset time expires.

In some examples, the third processing unit 194 may be specifically to:

store the first packet in a scheduling queue corresponding to a traffic flow to which the first packet belongs;

sort packets in the scheduling queue according to serial numbers of the packets;

forward packets in the scheduling queue to the destination terminal when a scheduling period of the scheduling queue expires.

In the technical solution provided by the example of the disclosure, the forwarding chip in the network device can process the first packet that needs to be forwarded through the multiple sending and selective receiving path immediately after the first packet is acquired, and the first packet is forwarded to a destination terminal when the packet information of the first packet is not stored locally in the network device. In case of the packet forwarding in multiple sending and selective receiving implemented by software, it is necessary to wait until all the first packets forwarded by the multiple sending and selective receiving path have been received before processing the packets. However, in the technical solution provided by the example of the disclosure, the packet forwarding in multiple sending and selective receiving is implemented by the forwarding chip using hardware, which ensures the reliability of packet transmission and improves the packet forwarding efficiency.

Corresponding to the above data processing methods, the example of the present disclosure also provides a forwarding chip for executing any of the above data processing methods.

Corresponding to the above data processing methods, the example of the disclosure also provides a network device, which includes at least one forwarding chip, wherein the forwarding chip is to execute any of the above data processing methods.

The forwarding chip can be NP (Network Processor), Application Specific Integrated Circuit (ASIC), Field-Programmable Gate Array (FPGA) or other hardware processing chips such as programmable logic devices, Digital Signal Processor (DSP), discrete gate or transistor logic devices, discrete hardware components and so on, or a combination of a plurality of chips, which is not limited.

In the above examples, it may be implemented in whole or in part by software, hardware, firmware or any combination thereof. When implemented in software, it can be implemented in whole or in part in the form of a computer procedure product. The computer procedure product includes one or more computer instructions. When the computer procedure instructions are loaded and executed on a computer, the processes or functions described in the examples of the present disclosure are generated in whole or in part. The computer may be a general purpose computer, special purpose computer, computer network, or other programmable device. The computer instructions may be stored in a computer readable storage medium or transmitted from one computer readable storage medium to another computer readable storage medium, for example, the computer instructions may be transmitted from a website, computer, server or data center to another website, computer, server, or data center by wire (such as coaxial cable, fiber optic, digital subscriber line (DSL)) or wirelessly (such as infrared, wireless, microwave, etc.). The computer-readable storage medium may be any usable medium that can be accessed by a computer or a data storage device such as a server and a data center and the like that includes an integration of one or more available media. The usable media may be magnetic media (such as a floppy disk, a hard disk, a magnetic tape), optical media (such as DVD), or semiconductor media (such as Solid State Disk (SSD)) and the like.

It should be noted that, relational terms such as first and second and the like herein are only used to distinguish one entity or operation from another and do not necessarily require or imply any such actual relationship or order between these entities or operations. Moreover, the terms "comprising", "including" or any other variations thereof are intended to encompass a non-exclusive inclusion such that a process, method, article or device that includes a series of elements includes not only those elements, but also includes other elements not explicitly listed or other elements inherent to such a process, method, article or apparatus. Without further limitation, elements defined by the phrase "comprising one . . . " do not preclude the presence of additional identical elements in a process, method, article or device that includes the mentioned elements.

The various examples in this specification are described in a related manner. Each example focuses on the differences from other examples, and the same and similar parts between the various examples can be referred to each other. Especially, for the example of the apparatus and the forwarding chip, the description is relatively simple because it is basically similar to the example of the method, and the relevant points can be referred to the partial description of the example of the method.

The above descriptions are only preferred examples of the disclosure, and are not intended to limit the disclosure. Any modifications, equivalent replacements, improvements and the like made within the spirit and principles of the disclosure shall be included within the scope of protection of the disclosure.

The invention claimed is:

1. A data processing method, which is applied to any forwarding chip in a network device, wherein the network device is a network device on a multiple sending and selective receiving path, the method comprising:

acquiring a first packet that needs to be forwarded through the multiple sending and selective receiving path;

forwarding, if the network device is a source network device on the multiple sending and selective receiving path, the first packet to a next hop network device on the multiple sending and selective receiving path respectively through multiple paths comprised in the multiple sending and selective receiving path;

forwarding, if the network device is an intermediate network device on the multiple sending and selective receiving path, the first packet to a next hop network device on the multiple sending and selective receiving path;

extracting, if the network device is a destination network device on the multiple sending and selective receiving path, packet information from the first packet, storing extracted packet information if the extracted packet information is not stored in the network device, and forwarding the first packet to a destination terminal, wherein the packet information of the first packet is used to distinguish different packets of a same traffic flow and different packets of different traffic flows;

after extracting packet information from the first packet, detecting, if the extracted packet information is stored in the network device, whether the extracted packet information stored in the network device reaches an aging time, deleting the extracted packet information stored in the network device if the extracted packet information reaches the aging time; or periodically deleting packet information reaching the aging time from the packet information stored in the network device; or monitoring each piece of packet information stored in the network device in real time, when it is monitored that any piece of packet information reaches the aging time, deleting this piece of packet information.

2. The method according to claim 1, wherein the acquiring a first packet that needs to be forwarded through the multiple sending and selective receiving path comprises:

receiving a second packet;

determining the first packet according to the second packet if it is determined that the second packet is a packet that needs to be forwarded through the multiple sending and selective receiving path.

3. The method according to claim 2, wherein determining the first packet according to the second packet comprises:

updating packet information of the second packet to obtain the first packet if the network device is the source network device on the multiple sending and selective receiving path;

determining the second packet as the first packet if the network device is the intermediate network device or the destination network device on the multiple sending and selective receiving path.

4. The method according to claim 2, wherein the method further comprises:

forwarding the second packet to a determined next hop network device if it is determined that the second packet is a packet that does not need to be forwarded through the multiple sending and selective receiving path.

5. The method according to claim 2, wherein whether the second packet is a packet that needs to be forwarded through the multiple sending and selective receiving path is determined through the following operations:

determining whether path information corresponding to a traffic flow to which the second packet belongs matches with pre-stored path information, wherein the pre-stored path information is path information corresponding to a traffic flow forwarded through the multiple sending and selective receiving path;

determining that the second packet is a packet that needs to be forwarded through the multiple sending and selective receiving path if path information corresponding to a traffic flow to which the second packet belongs matches with the pre-stored path information;

determining that the second packet is a packet that does not need to be forwarded through the multiple sending and selective receiving path if path information corresponding to a traffic flow to which the second packet belongs does not match with the pre-stored path information.

6. The method according to claim 5, wherein the path information comprises at least one set of the following information:

a logical port for forwarding a traffic flow;

a source address and a destination address corresponding to a traffic flow;

five-tuple information corresponding to a traffic flow.

7. The method according to claim 3, wherein the packet information comprises a flow label;

wherein updating packet information of the second packet to obtain the first packet comprises:

acquiring a first count value of a current flow label of a traffic flow to which the second packet belongs;

encapsulating a tunnel header to the second packet to obtain the first packet, wherein a value in a flow label field of the tunnel header is the acquired first count value.

8. The method according to claim 7, wherein after encapsulating a tunnel header to the second packet to obtain the first packet, the method further comprises:

increasing the first count value of the current flow label by 1.

9. The method according to claim 1, wherein the packet information comprises a flow label and first transmission information, and the first transmission information comprises any set of following information: a source address and a destination address corresponding to a traffic flow; and five-tuple information corresponding to a traffic flow;

wherein extracting packet information from the first packet comprises:

extracting a flow label of the first packet from a tunnel header of the first packet;

stripping the tunnel header of the first packet to obtain a third packet;

extracting the first transmission information from a header of the third packet.

10. The method according to claim 3, wherein the packet information comprises an identification value;

wherein updating packet information of the second packet to obtain the first packet comprises:

acquiring a second count value of a current identification value of a traffic flow to which the second packet belongs if a value in an identification field in a header of the second packet is empty;

filling the acquired second count value into the identification field in the header of the second packet, and encapsulating a tunnel header to the second packet to obtain the first packet.

11. The method according to claim 10, wherein after encapsulating a tunnel header to the second packet to obtain the first packet, the method further comprises:

increasing the second count value of the current identification value by 1.

12. The method according to claim 10, wherein the method further comprises:

encapsulating the tunnel header to the second packet to obtain the first packet if the identification field in the header of the second packet is filled with an identification value.

13. The method according to claim 1, wherein the packet information comprises an identification value and second transmission information, and the second transmission information comprises one or more of five-tuple information, More Fragment and Fragmentation Offset;

wherein extracting packet information from the first packet comprises:

stripping a tunnel header of the first packet to obtain a third packet;

extracting the identification value and the second transmission information from a header of the third packet.

14. The method according to claim 10, wherein when the network device comprise a plurality of forwarding chips, identification value ranges assigned for all of the forwarding chips do not overlap; and an identification value range corresponding to the network device overlaps or does not overlap with identification value ranges corresponding to other network devices in a network to which the network device belongs.

15. The method according to claim 1, wherein after extracting packet information from the first packet, the method further comprises:

discarding the first packet if the extracted packet information is stored in the network device.

16. The method according to claim 1, wherein forwarding the first packet to a destination terminal comprises:

forwarding the first packet to the destination terminal if a serial number of a current packet to be sent corresponding to a traffic flow to which the first packet belongs is the same as a serial number of the first packet;

waiting for a preset time period if the serial number of the current packet to be sent corresponding to the traffic flow to which the first packet belongs is different from the serial number of the first packet;

forwarding the first packet to the destination terminal if the serial number of the current packet to be sent is the same as the serial number of the first packet before the preset time period expires;

forwarding the first packet to the destination terminal if the serial number of the current packet to be sent is different from the serial number of the first packet after the preset time period expires.

17. The method according to claim 1, wherein forwarding the first packet to a destination terminal comprises:

storing the first packet in a scheduling queue corresponding to a traffic flow to which the first packet belongs;

sorting packets in the scheduling queue according to serial numbers of the packets;

forwarding the packets in the scheduling queue to the destination terminal when a scheduling period of the scheduling queue expires.

18. A forwarding chip, which is to execute the method according to claim 1.

19. A network device, wherein the network device comprises at least one forwarding chip, and the forwarding chip is to execute the method according to claim 1.

* * * * *